(12) United States Patent
Murata et al.

(10) Patent No.: US 7,681,943 B2
(45) Date of Patent: Mar. 23, 2010

(54) FRONT PART STRUCTURE OF VEHICLE BODY

(75) Inventors: Yuichi Murata, Shizuoka (JP); Kengo Miyawaki, Shizouka (JP)

(73) Assignee: Suzuki Motor Corporation, Shizuoka (JP)

( * ) Notice: Subject to any disclaimer, the term of this patent is extended or adjusted under 35 U.S.C. 154(b) by 78 days.

(21) Appl. No.: 12/191,470

(22) Filed: Aug. 14, 2008

(65) Prior Publication Data
US 2009/0058135 A1 Mar. 5, 2009

(30) Foreign Application Priority Data
Sep. 5, 2007 (JP) ............... P2007-230735

(51) Int. Cl.
*B62D 25/08* (2006.01)
(52) U.S. Cl. ............... 296/203.02; 296/187.09
(58) Field of Classification Search ............ 296/203.01, 296/203.02, 187.09, 187.1, 204, 205
See application file for complete search history.

(56) References Cited

U.S. PATENT DOCUMENTS

| 3,520,552 | A | * | 7/1970 | Graham et al. ............... 280/784 |
| 5,611,569 | A | | 3/1997 | Sekiguchi et al. |
| 6,736,449 | B2 | | 5/2004 | Takahashi et al. |
| 7,025,410 | B2 | * | 4/2006 | Kosaka .................. 296/187.09 |
| 7,213,873 | B2 | * | 5/2007 | Murata et al. ............... 296/204 |
| 7,246,966 | B2 | | 7/2007 | Jolley |
| 2005/0258667 | A1 | * | 11/2005 | Grueneklee et al. ......... 296/204 |
| 2008/0231080 | A1 | | 9/2008 | Sangu |

FOREIGN PATENT DOCUMENTS

| DE | 195 36 460 A1 | 4/1996 |
| DE | 602 07 015 T2 | 8/2006 |
| EP | 1 508 508 B1 | 5/2007 |
| JP | 1-116778 | 8/1989 |

OTHER PUBLICATIONS

Office Action issued in German Patent Application No. 102008046126.1 on Jul. 9, 2009.
U.S. Appl. No. 12/190,650 to Hiraishi et al, filed Aug. 13, 2008.

* cited by examiner

*Primary Examiner*—Dennis H Pedder
(74) *Attorney, Agent, or Firm*—Stein McEwen, LLP (57) ABSTRACT

A front part structure of a vehicle body is provided. A suspension frame is disposed posterior to a front-side component in a longitudinal direction of the vehicle. An apron side member extends in the longitudinal direction. An apron lower member extends in the longitudinal direction, connects the front-side component and the suspension frame and is disposed below the apron side member. The apron lower member is formed into a square cylindrical shape. Two walls of the apron lower member, which are opposed to each other are respectively fixed to the suspension frame.

6 Claims, 10 Drawing Sheets

FRONT PART STRUCTURE OF VEHICLE BODY

This application claims priority from Japanese Patent Application No. 2007-230735 filed Sep. 5, 2007, the entire contents of which are herein incorporated by reference.

BACKGROUND

The present invention relates to a front part structure of a vehicle body including an apron side member which is disposed in a longitudinal direction of a vehicle, an apron lower member which is disposed below the apron side member in the longitudinal direction of the vehicle so that the apron lower member connects a front-side component of a vehicle to a suspension frame.

In the front part structure of the vehicle body, a suspension arm attachment portion is disposed in an end portion (hereinafter, referred to as 'front end portion') of the suspension frame on the front side of the vehicle in consideration of the layout of an engine or a transmission. In addition, an apron lower member attachment portion to be attached with the rear end portion of the apron lower member is disposed in the front end portion so as not to interrupt an operation in which the suspension arm is attached to the suspension arm attachment portion.

As an example, in the past, a structure of the apron lower member attachment portion is known in which a nut is fixed by welding to an upper surface of a flange protruding from the front end portion of the suspension frame and a bolt insertion hole which is concentric with the nut is formed in the flange. Then, the upper surface of the rear end portion of the apron lower member comes into contact with only the lower surface of the flange, and then an attachment bolt is inserted through the bolt insertion hole from the downside to thereby be screw-connected to the nut.

As another example, a structure is known in which the lower surface of the rear end portion of the apron lower member comes into contact with only the upper surface of the front end portion of the suspension frame to thereby carry out an attaching/fixing operation (see Patent Document 1).

Patent Document 1: Japanese Utility Model Publication No. 1-116778 A

The apron lower member transmits a shock generated from the front side of the vehicle to rear-side components such as a suspension frame so as to support the shock together with the rear-side components, thereby functioning to restrict the vehicle from being deformed by the applied shock. In order to carry out the restricting function, the apron lower member is configured to have large rigidity.

However, according to the known structure, since the rear end portion of the apron lower member is attached to the suspension frame in such a manner that the upper surface of the rear end portion of the apron lower member comes into contact with only the lower surface of the flange and then the attachment bolt is inserted through the bolt insertion hole from the downside to thereby be screw-connected to the nut, attachment strength that the rear end portion of the apron lower member is attached to the front end portion of the suspension frame is not strong. Additionally, even when rigidity of the apron lower member is strong, a shock generated from the front side of the vehicle cannot be sufficiently transmitted to the rear-side components such as the suspension frame. As a result, a problem arises in that it is difficult to sufficiently restrict the vehicle from being deformed when the shock is applied.

SUMMARY

It is therefore an object of the invention to provide a front part structure of a vehicle body capable of sufficiently restricting the vehicle from being deformed by a shock applied from the front side of the vehicle.

According to an aspect of an exemplary embodiment of the present invention, there is provided a front part structure of a vehicle body, comprising: a front-side component of a vehicle; a suspension frame disposed posterior to the front-side component in a longitudinal direction of the vehicle; an apron side member extending in the longitudinal direction; and an apron lower member extending in the longitudinal direction, connecting the front-side component and the suspension frame and being disposed below the apron side member, wherein the apron lower member is formed into a square cylindrical shape; and wherein two walls of the apron lower member, which are opposed to each other are respectively fixed to the suspension frame.

With such a configuration, since the apron lower member is formed into the square cylindrical shape, the apron lower member can be configured as a structure with a closed section, thereby improving strength and rigidity of the apron lower member. In addition, since the two opposed wall of the apron lower member are respectively fixed to the suspension frame, a connection portion between the apron lower member and the suspension frame can be configured as a structure which can strongly withstand an external force, thereby improving connection rigidity thereof. Accordingly, it is possible to surely transmit a shock generated from the front side of the vehicle to the rear-side components such as the suspension frame through the apron lower member and it is possible to support the shock together with the rear-side components. Accordingly, it is possible to easily restrict the vehicle from being deformed by the applied shock.

The two walls may be an upper wall and a lower wall of the apron lower member, respectively; the suspension frame may be provided with an upper attachment portion in which a first nut is fixed to an upper surface thereof and a lower attachment portion in which a second nut is fixed to an upper surface thereof; a first attachment bolt may be threaded into the first nut so that a first attachment portion of the upper wall is fixed to the upper attachment portion of the suspension frame in a state that the first attachment portion overlaps with the upper attachment portion from the downside; and a second attachment bolt may be threaded into the second nut so that a second attachment portion of the lower wall is fixed to the lower attachment portion of the suspension frame in a state that the second attachment portion overlaps with the lower attachment portion from the downside.

With such a configuration, the first attachment portion is fixed to the upper attachment portion by the first attachment bolt threaded into the first nut in the state that the first attachment portion of the upper wall of the apron lower member overlaps with the upper attachment portion of the suspension frame from the downside. Then, the second attachment portion is fixed to the lower attachment portion by the second attachment bolt threaded into the second nut in the state that the second attachment portion of the lower wall overlaps with the lower attachment portion from the downside. In this way, a mounting operation is carried out from the downside of the vehicle, in which components of the vehicle do not exist, thereby improving the mounting operation.

Additionally, since the first attachment portion of the upper wall is fixed to the upper attachment portion by a bolt and the second attachment portion of the lower wall is fixed to the lower attachment portion by a bolt, even when a thickness of upper and lower sections of the apron lower member (a length from the upper surface of the upper wall to the lower surface of the lower wall) is configured to be thin, it is possible to ensure connection strength of the connection portion between the apron lower member and the suspension frame. As a result, it is possible to make the thickness of the upper and lower sections of the apron lower member thin, and thus it is possible to easily secure the minimum ground height related to running ability.

The upper attachment portion may extend to the front side of the vehicle with respect to the lower attachment portion; and the first nut may be disposed anterior to the second nut. Accordingly, it is possible to further widen a gap between the first attachment bolt being threaded into the first nut and the second attachment bolt being threaded into the second nut in the longitudinal direction of the vehicle, thereby further improving connection strength of the connection portion between the apron lower member and the suspension frame. Such effect and advantage are particular efficient for the apron lower member which corresponds to a long component in the longitudinal direction of the vehicle.

A first bolt insertion hole which is concentric with the first nut may be formed in the lower wall, the first attachment portion, and the upper attachment portion; a collar which is concentric with the first nut may be interposed between the upper wall and the lower wall; the first attachment bolt may be inserted through the first bolt insertion hole and the collar from the downside of the lower wall so as to be threaded into the first nut; a second bolt insertion hole which is concentric with the second nut may be formed in the second attachment portion and the lower attachment portion; and the second attachment bolt may be inserted through the second bolt insertion hole from the downside of the lower wall so as to be threaded into the second nut.

The first bolt insertion hole which is concentric with the first nut is formed in the lower wall, the first attachment portion, and the upper attachment portion. The collar which is concentric with the first nut is interposed between the upper wall and the second wall. The first attachment bolt is inserted through the first bolt insertion hole and the collar from the downside of the lower wall to be threaded into the first nut. Accordingly, it is possible to surely transmit a fastening force of the first attachment bolt to the respective portions such as the first attachment portion through the collar. In addition, since the collar guides the first attachment bolt, it is possible to simply and easily carry out operations in which the first attachment bolt is inserted and fastened to the first bolt insertion hole.

The second bolt insertion hole which is concentric with the second nut is formed in the second attachment portion and the lower attachment portion. The second attachment bolt is inserted through the second bolt insertion hole from the downside of the lower wall to be threaded into the second nut. Accordingly, it is possible to surely transmit a fastening force of the second attachment bolt to the respective portions such as the second attachment portion.

As a result, it is possible to further improve connection strength of the connection portion between the apron lower member and the suspension frame.

The second attachment portion may extend to the rear side of the vehicle with respect to the first attachment portion; a first vertical wall may be extended downward from a side portion of the upper attachment portion on the inside of a width direction of the vehicle; and a second vertical wall may be extended downward from a side portion of the lower wall on the outside of the width direction of the vehicle so as to be opposed to the first vertical wall.

Since the first vertical wall extends downward from the side portion of the upper attachment portion on the inside of in the width direction of the vehicle, and the second vertical wall is extended upward from the side portion of the lower wall on the outside of the width direction of the vehicle so as to be opposed to the first vertical wall, it is possible to allow the connection portion between the apron lower member and the suspension frame to be configured as a structure which strongly withstands an external force.

Additionally, since the first vertical wall is positioned at the side portion of the upper attachment portion on the inside of the width direction of the vehicle, the apron lower member can be mounted to the suspension frame without being interrupted by the first vertical wall on the side of the suspension frame. Accordingly, it is possible to improve an operation in which the apron side member is mounted to the suspension frame.

A third vertical wall may be extended upward from an outside portion of the lower attachment portion in the width direction of the vehicle so that an upper end portion of the third vertical wall overlaps with an outside portion of the upper attachment portion in the width direction of the vehicle. Accordingly, it is possible to allow an attachment body including the upper attachment portion and the lower attachment portion to be configured as a structure which strongly withstands an external force.

A suspension arm attachment portion of the suspension frame may be disposed in an end portion of the suspension frame on the front side of the vehicle; a front wall and a rear wall may be provided in the suspension arm attachment portion so as to be opposed to each other in the longitudinal direction of the vehicle; a third bolt insertion hole may be formed in the front wall and the second wall so that a suspension arm attachment bolt is inserted therethrough; and the upper attachment portion may be extended to the front side of the vehicle from an upper surface portion suspended between upper end portions of the front wall and the rear wall.

With this configuration, it is possible to allow the suspension arm attachment portion and the first attachment portion and the second attachment portion of the apron lower member to be adjacent to each other in the longitudinal direction of the vehicle. As a result, it is possible to set the suspension frame to be short in the longitudinal direction of the vehicle and to set the apron lower member to be long in the longitudinal direction of the vehicle, thereby improving shock absorbing performance of the apron lower member.

Accordingly, it is possible to provide a front part structure of a vehicle body capable of sufficiently restricting the vehicle from being deformed by a shock applied from the front side of the vehicle.

BRIEF DESCRIPTION OF THE DRAWINGS

The above and other aspects of the present invention will become more apparent by describing in detail exemplary embodiments thereof with reference to the accompanying drawings, wherein.

DETAILED DESCRIPTION OF EXEMPLARY EMBODIMENTS

Hereinafter, an exemplary embodiment of the invention will be described with reference to the accompanying drawings. FIGS. 1 to 4 illustrate a front part structure of a vehicle body of a vehicle. As shown in the respective drawings, a pair of left and right apron lower members 2 are longitudinally disposed below a pair of left and right apron side members 1 which are disposed in a longitudinal direction of a vehicle. At this time, the apron lower members 2 connect a radiator support lower member 25 (which corresponds to a component on the front side of the vehicle) which is disposed in a width direction D of a vehicle to a suspension frame 5 which supports a suspension arm 4 (see FIG. 9) or a steering gear box.

Each of the apron side members 1 includes a first linear portion 1A which extends in the longitudinal direction, a slope portion 1B which extends downward at an oblique angle from an end portion of the first linear portion 1A on the rear side of the vehicle in the backward direction of the vehicle, and a second linear portion 1C which extends from an end portion of the slope portion 1B on the rear side of the vehicle in the backward direction of the vehicle. Each of the apron side members 1 and the apron lower members 2 is formed into a square cylindrical shape by a plate member, and hence prevents a vehicle body from being deformed by receiving a force applied from the front side Fr of the vehicle when a collision occurs from the front side Fr of the vehicle.

A front upper member 9 is disposed above the radiator support lower member 25 in the width direction D of the vehicle, and a center member 7 is suspended between center portions of the radiator support lower member 25 and the front upper member 9 in a vertical direction. In addition, a pair of left and right lamp support braces 8 with a square cylindrical shape are suspended between the radiator support lower member 25 and the front upper member 9 in the vertical direction, and then the lower end portions of the lamp support braces 8 are respectively connected to left and right end portions 25A and 25B (which corresponds to one end portion) of the radiator support lower member 25.

Figure 1:
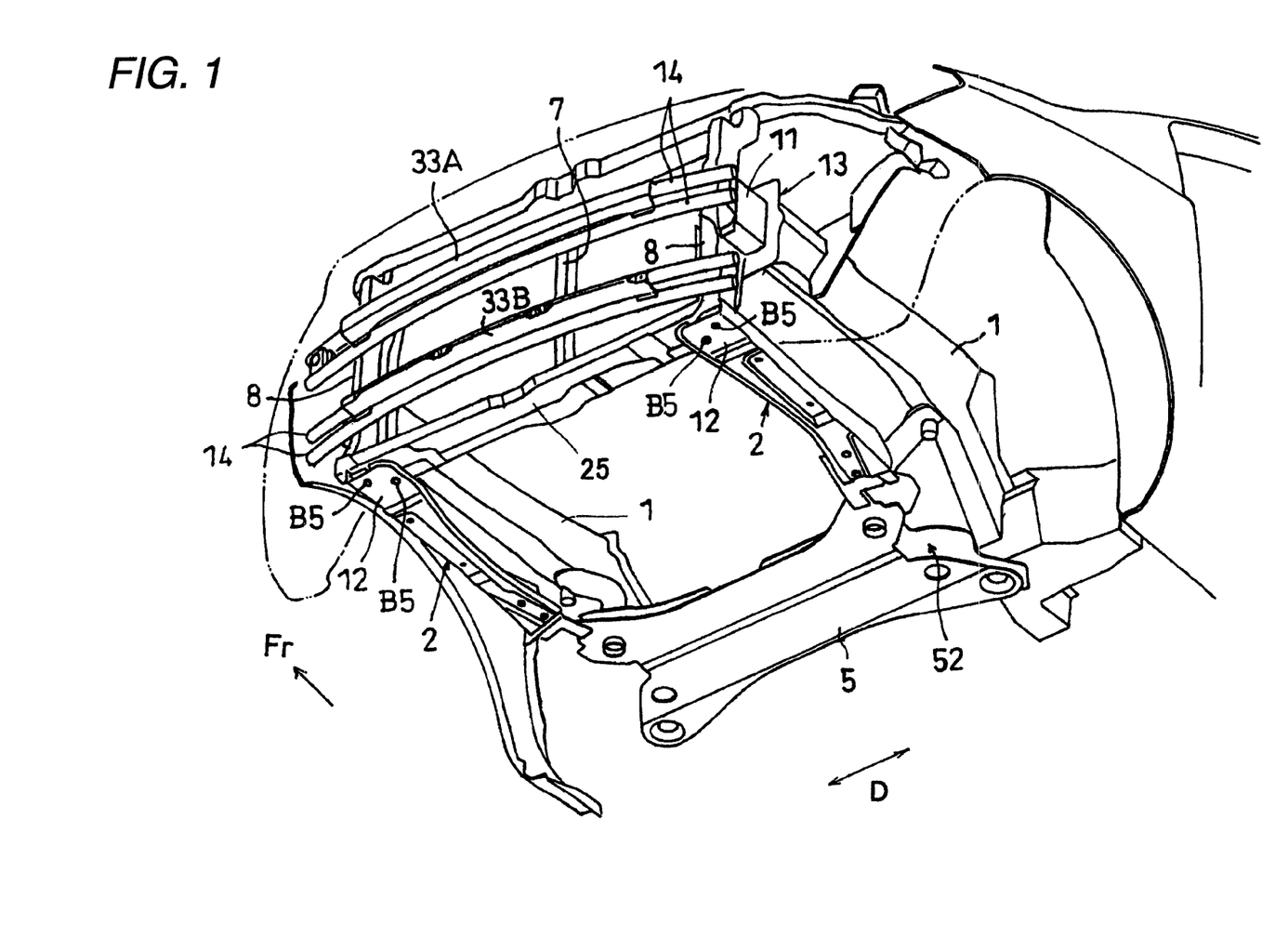
FIG. 1 is a view illustrating a front part structure of a vehicle body when obliquely viewed from the downside.
Figure 2:
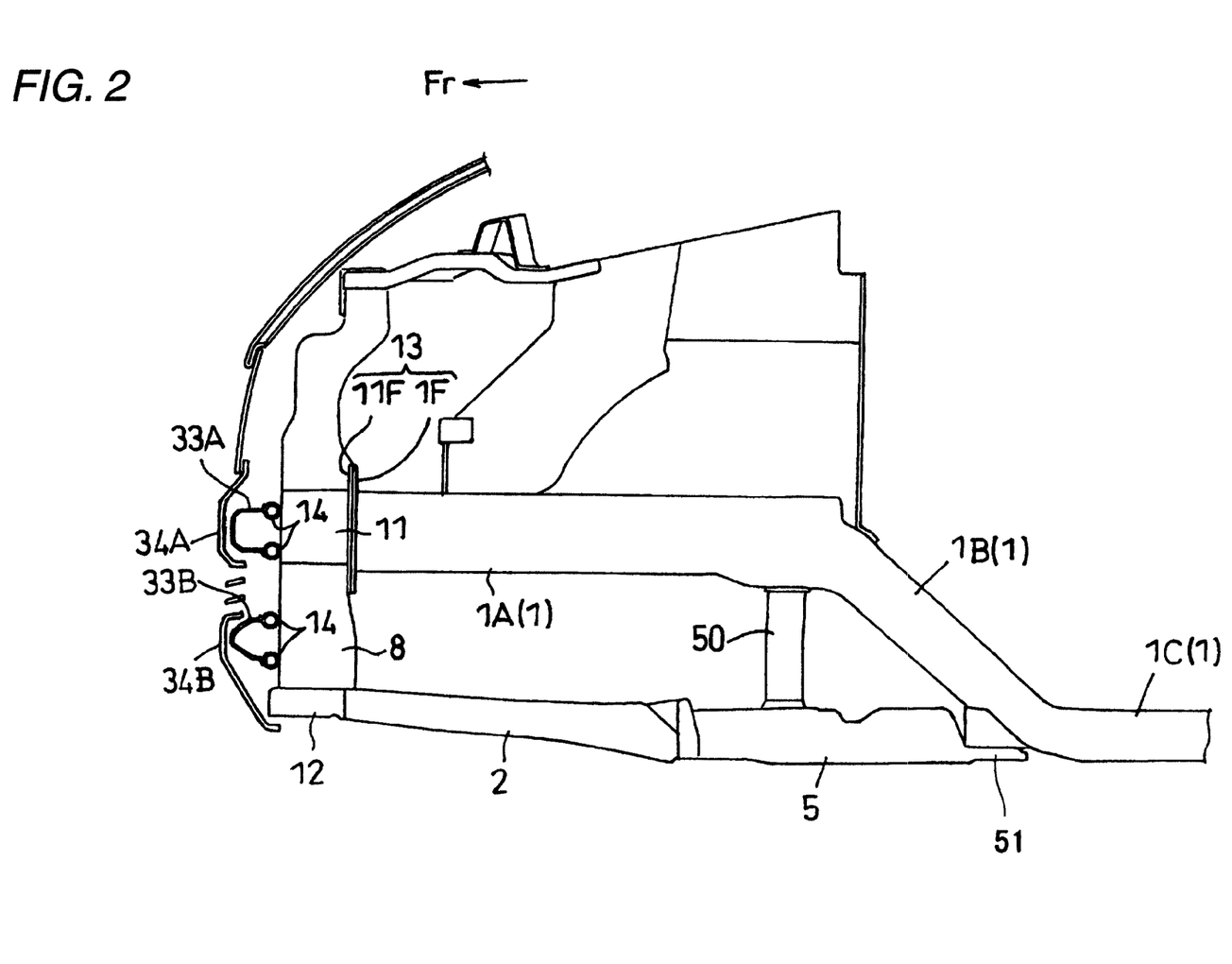
FIG. 2 is a side view illustrating the front part structure of the vehicle body.

As shown in FIGS. 1 and 2, the front end portion of the apron side member 1 is attached to a first shock absorbing portion 11 called a crash box, which is formed into a square box shape in a sectional view by a plate member, through an attachment flange 13. The first shock absorbing portion 11 has a bead which is formed in a side wall thereof so as to have a circular arc shape in a sectional view in the vertical direction and a bead which is formed in both upper and lower surfaces thereof in the width direction D of the vehicle, and is hence configured to be easily deformed by a force applied from the front side Fr of the vehicle.

The front end portion of the first shock absorbing portion 11 is connected to an upper bumper member 33A through a pair of upper and lower long pipe members 14 which are disposed in the width direction D of the vehicle, and a bumper fascia 34A is disposed in the upper bumper member 33A on the front side Fr of the vehicle. The upper bumper member 33A is formed into a U-shape in a sectional view to be opened to the rear side of the vehicle.

Figure 3:
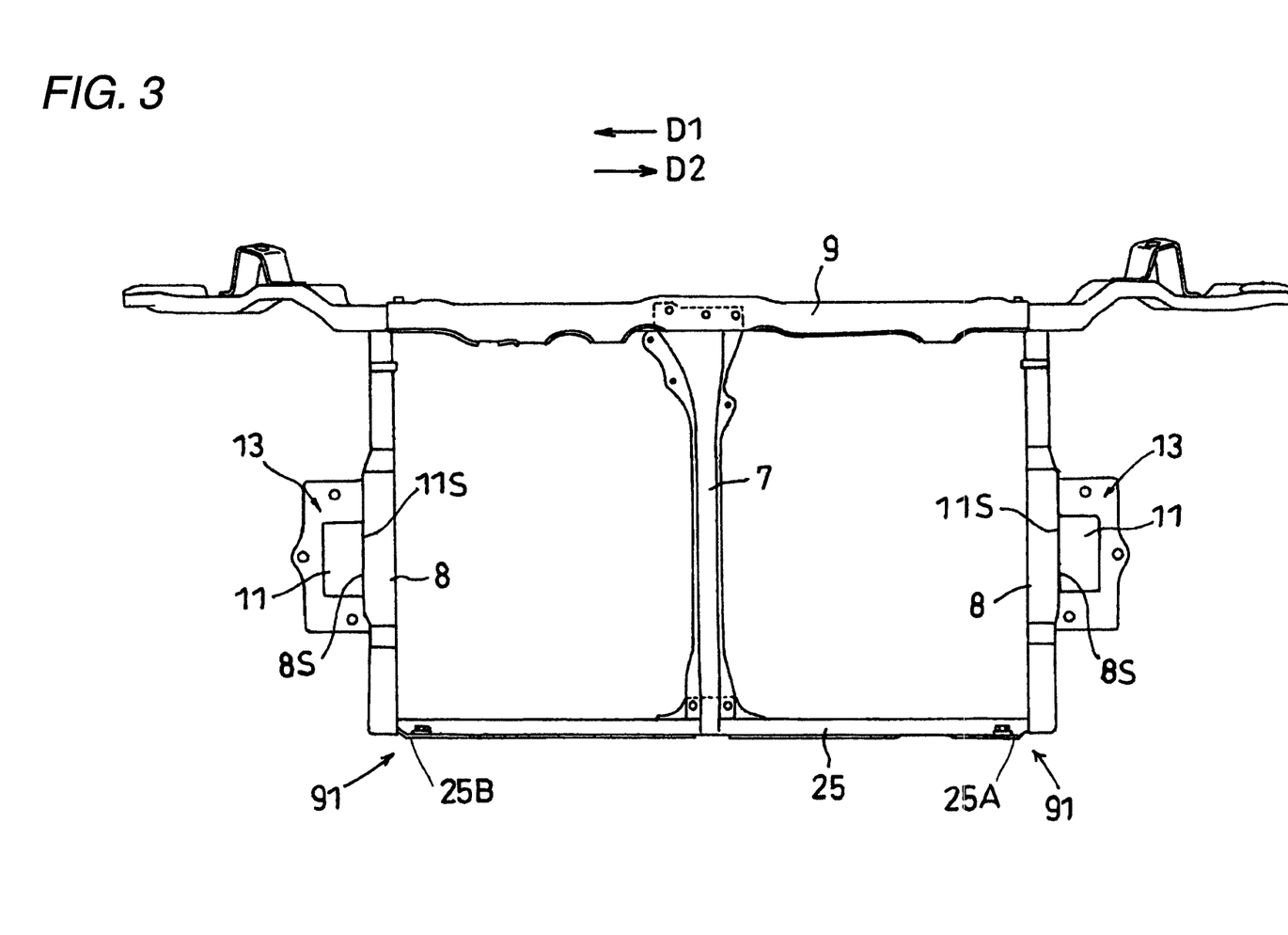
FIG. 3 is a front view illustrating a frame structure of the front part of the vehicle body.
Figure 4:
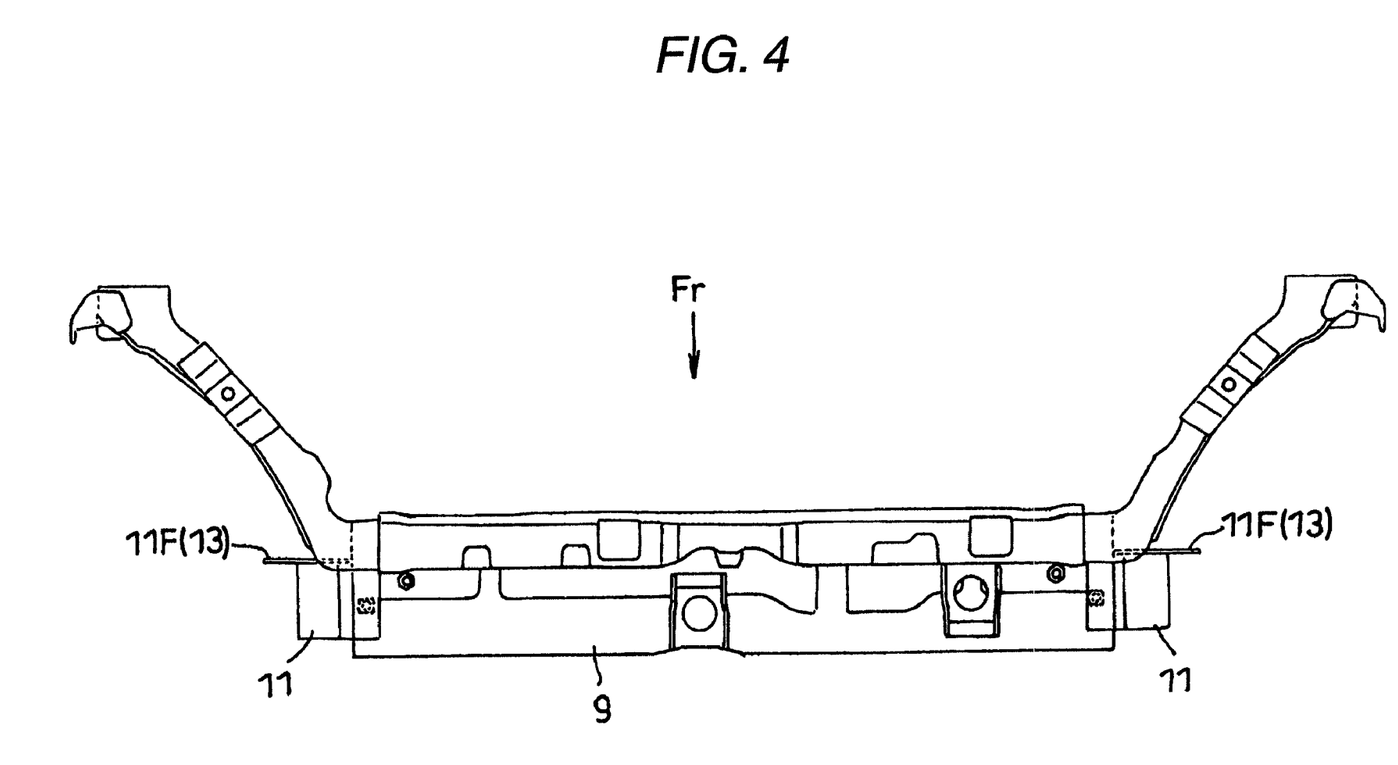
FIG. 4 is a top view illustrating the frame structure of the front part of the vehicle body.

As shown in FIGS. 2 and 3, a side surface 11S (i.e., a flange provided in a side surface) of the first shock absorbing portion 11 on the inside D1 of the width direction of the vehicle and a side surface 8S of the lamp support brace 8 on the outside D2 of the width direction of the vehicle are fixed by welding to each other while overlapping with each other. The attachment flange 13 includes a first flange portion 11F which is fixed by welding to the rear end surface of the first shock absorbing portion 11 and a second flange portion 1F which is fixed to the front end portion of the apron side member 1, and both flange portions 11F and 1F are fixed by a bolt to each other in the longitudinal direction of the vehicle while overlapping with each other.

[Structure of Apron Lower Member 2]

As shown in FIGS. 5(A), 5(B), and 8(A) to 8(C), the apron lower member 2 includes an upper wall 70 and a lower wall 71, and has a long square cylindrical shape in the longitudinal direction of the vehicle. At this time, a height dimension of the apron lower member 2 is set to be smaller than a width dimension thereof. The upper wall 70 is formed into a member separated from the lower wall 71. At this time, a first side wall 72 on the inside D1 of the width direction of the vehicle extends downward from a side portion of the upper wall 70 on the inside D1 of the width direction of the vehicle and a second side wall 73 on the outside D2 of the width direction of the vehicle erects upward from a side portion of the lower wall 71 on the outside D2 of the width direction of the vehicle.

In addition, a first bent piece 74 which is formed such that the lower end portion of the first side wall 72 is bent to the inside D1 of the width direction of the vehicle and one end portion of the lower wall 71 on the inside D1 of the width direction of the vehicle are fixed by welding to each other while the first piece 74 overlaps with the one end portion from the upside. Then, a second bent piece 75 which is formed such that the end portion of the upper wall 70 on the outside D2 of the width direction of the vehicle is bent upward and the upper end portion of the second side wall 73 are fixed by welding to each other while overlapping with each other in the inside D1 of the width direction of the vehicle.

Further, a second shock absorbing portion 12 is provided in the front end portion of the apron lower member 2 so as to be disposed below the first shock absorbing portion 11. That is, as shown in FIG. 2, the front end portion of the apron lower member 2 protrudes more than the attachment flange 13 to the front side Fr of the vehicle, and then the protruding front end portion of the apron lower member 2 is configured to be weaker than an apron lower member portion 36 which is disposed in the front end portion on the rear side of the vehicle, thereby configuring the second shock absorbing portion 12. Strength of the apron lower member portion 36 is stronger than the second shock absorbing portion 12, and strength of the suspension frame 5 is stronger than the apron lower member portion 36. Accordingly, when a shock is applied from the front side of the vehicle, the vehicle is sequentially deformed from the front part of the vehicle, thereby making a deformation of the vehicle as small as possible.

Figure 8:
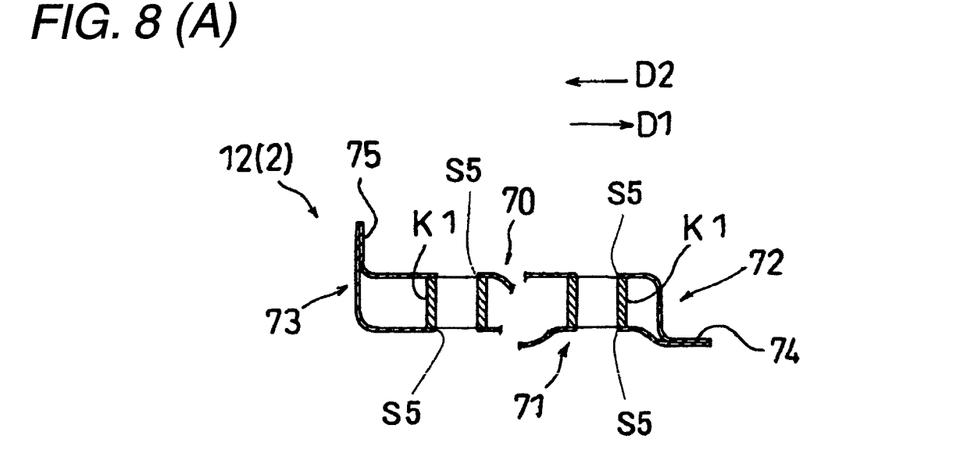
FIG. 8(A) is a sectional view taken along the line A-A shown in FIG. 5(A)
FIG. 8(B) is a sectional view taken along the line B-B shown in FIG. 5(A)
FIG. 8(C) is a sectional view taken along the line C-C shown in FIG. 5(A)

As means for configuring the second shock absorbing portion 12 as the front end portion of the apron lower member 2 to be weaker, this embodiment includes first means (see FIG. 8(C)) in which the second shock absorbing portion 12 is formed by a plate member thinner than that of the apron lower member portion 36, and second means in which a bead 35 formed in the width direction D of the vehicle is formed the upper wall 70 and the lower wall 71 of the second shock absorbing portion 12. Instead of the structure, either the first means or the second means may be adopted. The bead 35 is configured such that a predetermined part of the upper wall 70 and the lower wall 71 is formed into a circular arc shape in a sectional view so as to be convex upward by press machining.

As shown in FIG. 8(C), the end portion of the upper wall 70 of the second shock absorbing portion 12 on the rear side of the vehicle and the end portion of the lower wall 71 of the second shock absorbing portion 12 on the rear side of the vehicle are respectively fixed to the end portion of the upper wall 70 of the apron lower member portion 36 on the front side Fr of the vehicle and the end portion of the lower wall 71 of the apron lower member portion 36 on the front side Fr of the vehicle while overlapping with the end portion of the upper wall 70 and the end portion of the lower wall 71 from the downside.

Figure 5:
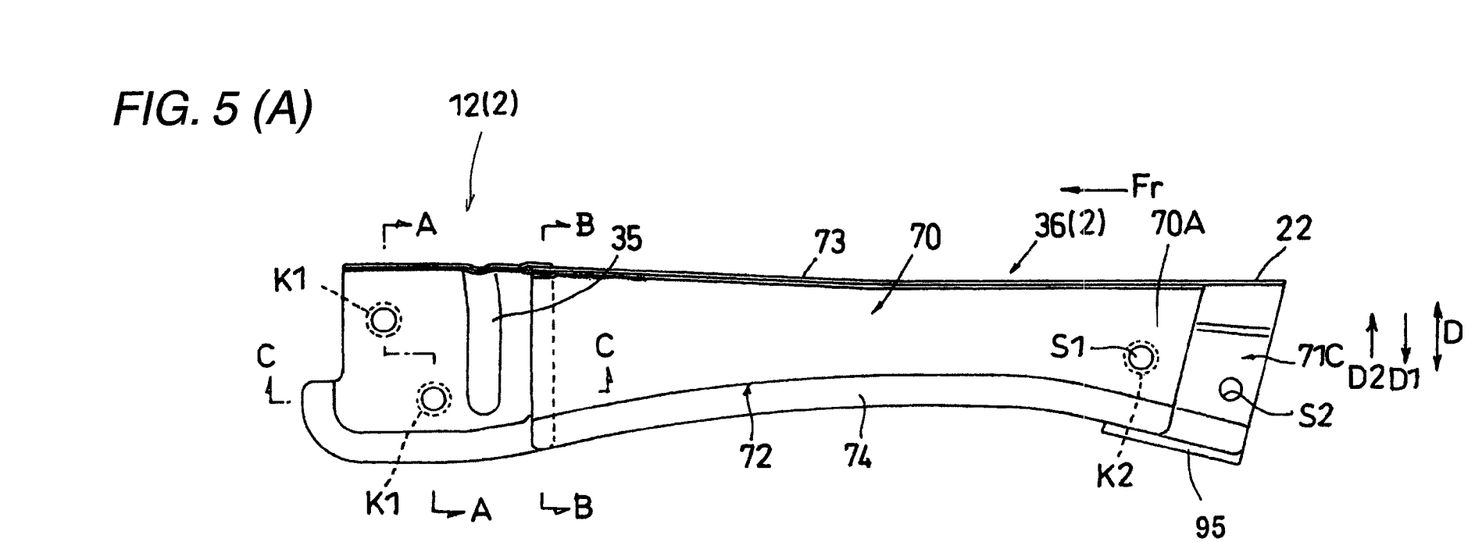
FIG. 5(A) is a top view illustrating an apron lower member.
FIG. 5(B) is a side view illustrating the apron lower member.

As shown in FIGS. 5(A) and 5(B), the apron lower member portion 36 extends in a linear shape in the longitudinal direction of the vehicle in such a manner that the upper wall 70 is positioned at the same height as that of the upper wall 70 of the second shock absorbing portion 12 and the second side wall 73 on the outside D2 of the width direction D of the vehicle is positioned at the same height as that of the second side wall 73 of the second shock absorbing portion 12 on the outside D2 of the width direction D of the vehicle.

The first side wall 72 of the apron lower member portion 36 on the inside D1 of the width direction is curved in a convex circular arc shape in the outside D2 of the width direction of the vehicle. The lower wall 71 of the apron lower member portion 36 is inclined downward in the backward direction of the vehicle. At this time, in a rear end portion 71C of the lower wall 71 as the rear end portion of the inclined surface, the inclined surface of the rear end portion 71C is inclined downward more than the inclined surface on the front side Fr of the vehicle.

The lower wall 71 of the apron lower member portion 36 extends to the rear side of the vehicle with respect to the upper wall 70 thereof, and a strengthening plate member 95 is fixed by welding to the lower surface of the rear end portion 71C of the lower wall 71 while overlapping with the lower surface of the rear end portion 71C. The rear end portion 71 and the structure in the vicinity thereof will be described in detail later.

Both the upper and lower end portions of first collars K1 are respectively fixed by welding to the lower surface of the upper wall 70 and the upper surface of the lower wall 71 in the state that a pair of first bolt insertion collars K1 are interposed between the upper wall 70 and the lower wall 71 of the second shock absorbing portion 12. Then, shock-absorbing-portion-side bolt insertion holes S5 are formed in the upper wall 70 and the lower wall 71 so as to be concentric with the first collars K1 (see FIGS. 8(A) and 8(C)). The pair of first collars K1 are positioned at different positions in the width direction D of the vehicle and the longitudinal direction of the vehicle (in the longitudinal direction of the apron lower member 2), and a lower wall portion 80 to which the lower end portion of the first collar K1 is fixed by welding is concave upward.

Then, the first shock absorbing portion 11 is connected to the second shock absorbing portion 12 through the lamp support brace 8. That is, the second shock absorbing portion 12 is fixed by a bolt to the connection portion 91 (see FIG. 3) of the lower end portions of the lamp support braces 8 and the left and right end portions 25A and 25B of the radiator support lower member 25 by use of an attachment bolt B5 (see FIG. 1) which is inserted through the shock-absorbing-portion-side bolt insertion hole and the pair of first collars K1 from the downside.

A lower bumper member 33B is connected to the front surface of the lamp support brace between the first shock absorbing portion 11 and the second shock absorbing portion 12 through the pair of upper and lower long pipe members 14 which are disposed in the width direction D of the vehicle, and a bumper fascia 34B is disposed in the lower bumper member 33B on the front side Fr of the vehicle. The lower bumper member 33B is formed into U-shape in a sectional view to be opened to the rear side of the vehicle.

[Structure of Suspension Frame 5]

Figure 6:
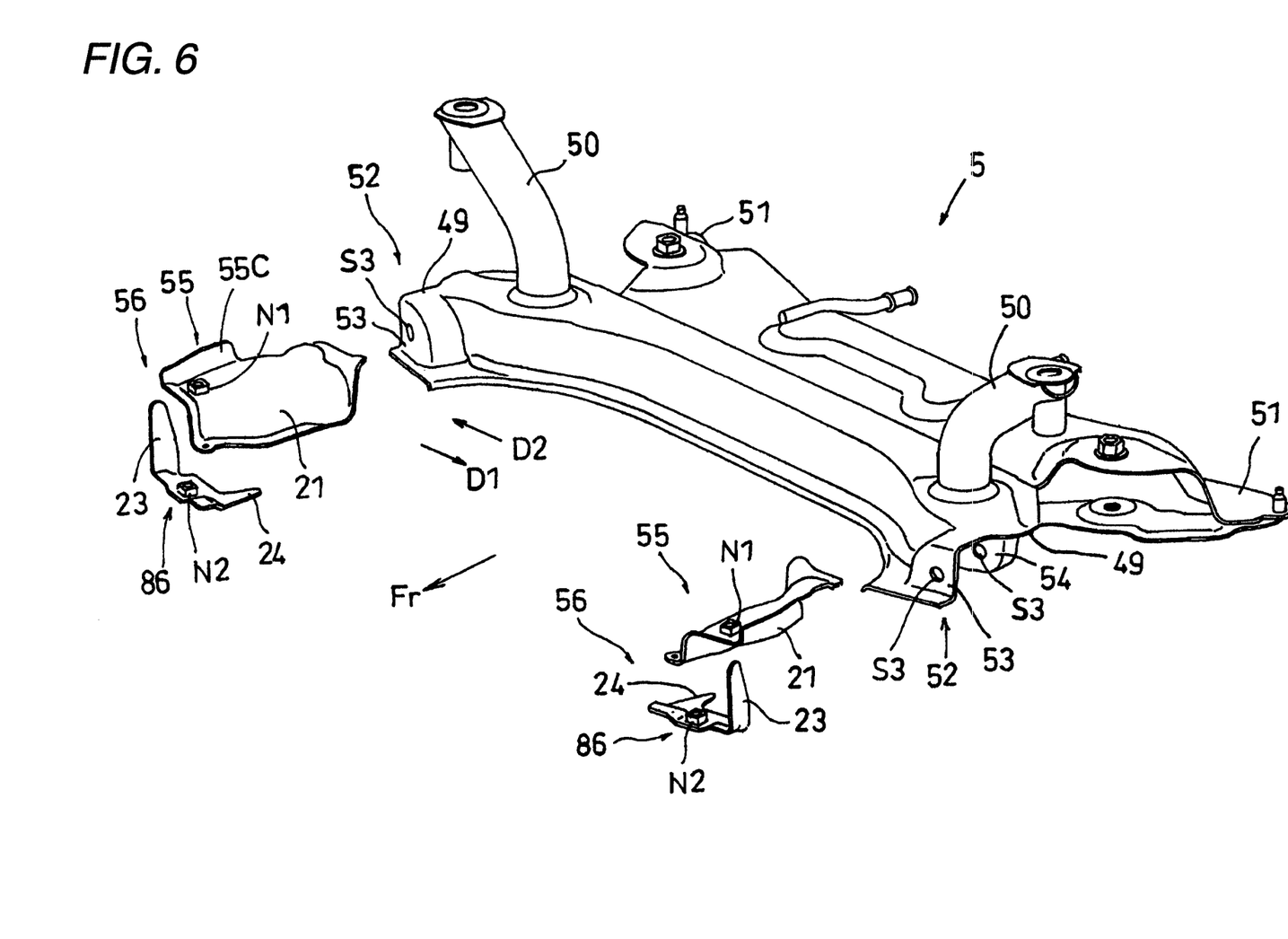
FIG. 6 is an exploded perspective view illustrating a suspension frame.
Figure 7:
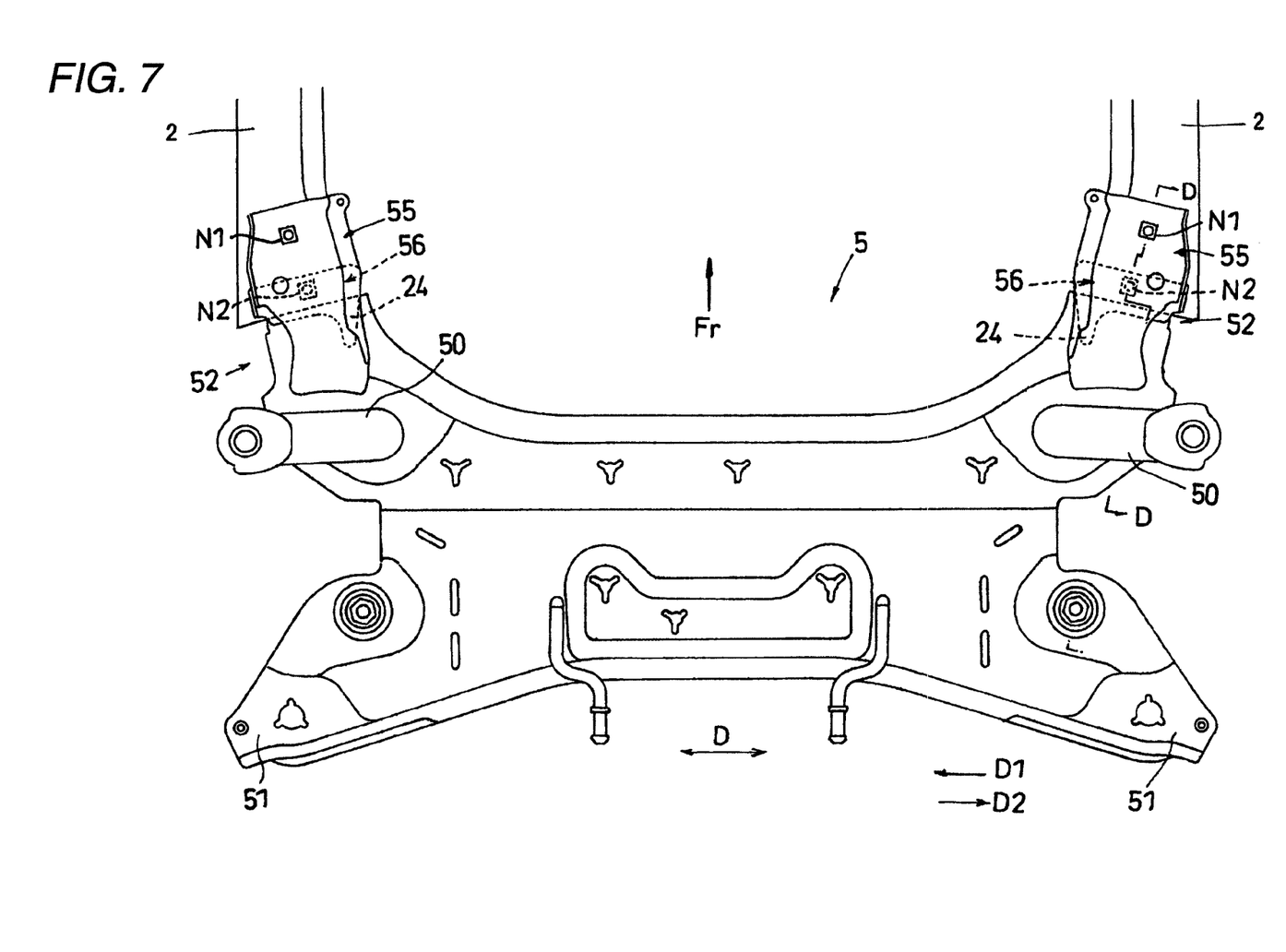
FIG. 7 is a top view illustrating the suspension frame.

As shown in FIGS. 6 and 7, the suspension frame 5 is formed into a hollow shape so that a height dimension is smaller than a width dimension, that is, the width dimension is longer than the height dimension. In addition, a pair of connection pipes 50, which are bent from the end portion of the suspension frame 5 on the front side Fr of the vehicle, are erected. As shown in FIGS. 1 and 2, the upper end portions of the connection pipes 50 is connected to the lower surfaces of the rear end portion of the first linear portions 1A of the apron side members 1 and then connection portions 51, which are provided in both left and right end portions of the suspension frame 5 on the rear side of the vehicle, are connected to the lower end portions of the slope portions 1B of the apron side members 1. The apron lower members 2, the suspension frame 5, and the second linear portions 1C of the apron side members 1 are horizontally connected to each other.

Suspension arm attachment portions 52 are disposed in the front end portion (both right and left end portions on the front side of the vehicle) of the suspension frame 5 on the front side Fr of the vehicle rather than the lower parts of the connection pipes 50, and the suspension arm attachment portions 52 are respectively provided with a front wall 53 and a rear wall 54 which are opposed to each other in the longitudinal direction of the vehicle. Then, an upper surface portion 49 is suspended between the front wall 53 and the rear wall 54, and a suspension-arm-attachment-bolt insertion hole S3 (which corresponds to a third bolt insertion hole), through which a suspension arm attachment bolt B3 is inserted, is formed in the front wall 53 and the rear wall 54. Reference Numeral N3 shown in FIG. 9 denotes a third nut to which the suspension arm attachment bolt B3 is screw-connected, and the third nut is fixed by welding to the rear surface of the rear wall 54.

A gap formed between the front wall 53 and the rear wall 54 is opened to the downside in the outside D2 of the width direction of the vehicle. Then, as shown in FIG. 9, one end portion 4A of the suspension arm 4 is attached to the front wall 53 and the rear wall 54 by the suspension arm attachment bolt B3 which is inserted through the suspension-arm-attachment-bolt insertion hole S3.

[Structure of Connection Portion of Suspension Frame 5 and Apron Lower Member 2]

Figure 9:
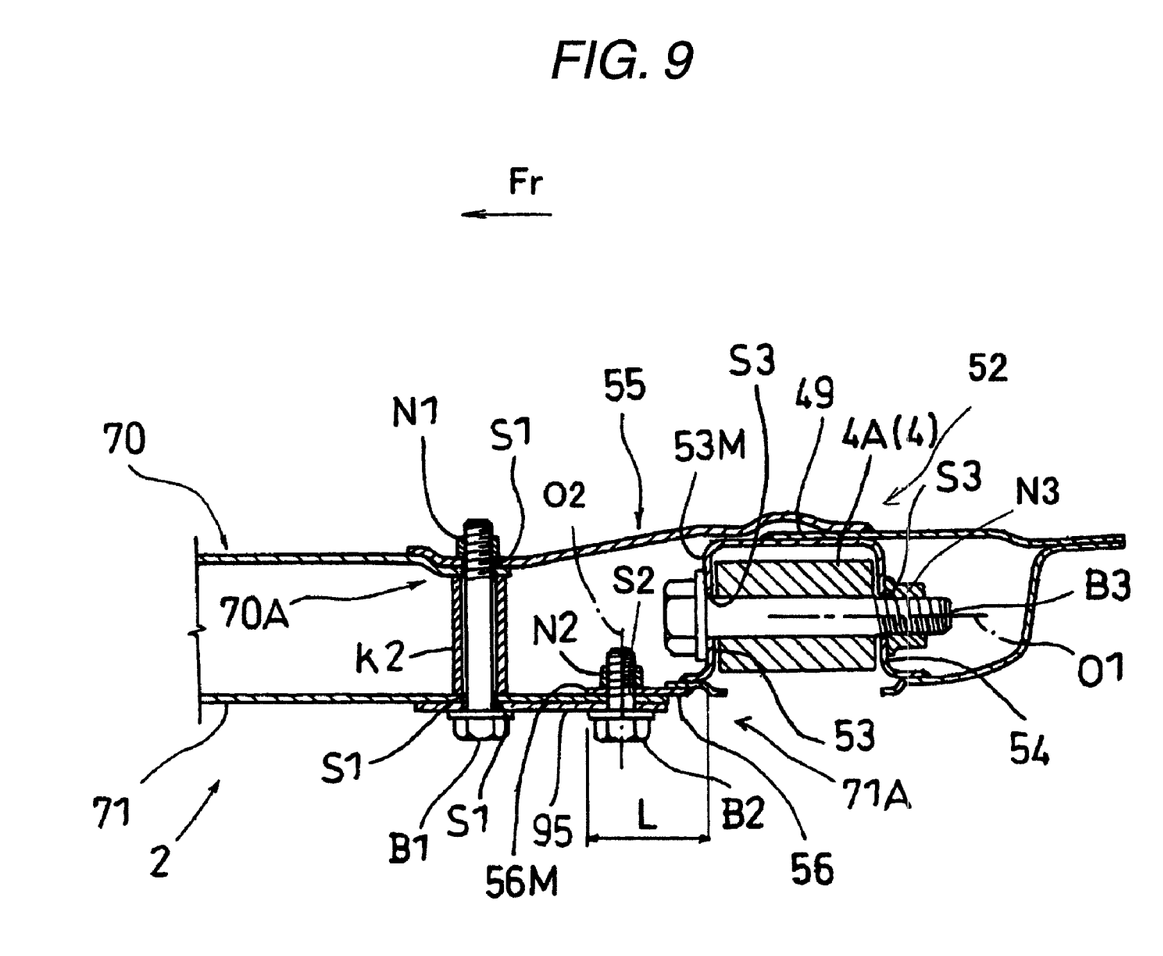
FIG. 9 is a sectional view illustrating a state in which a relative component is mounted when taken along the line D-D shown in FIG. 7.

As shown in FIGS. 7 and 9, the upper wall 70 and the lower wall 71 of the apron lower member 2 which are opposed to each other (which correspond to two wall portions) are respectively fixed to an upper attachment portion 55 and a lower attachment portion 56 which are provided in the end portion (both right and left end portions on the front side of the vehicle) of the suspension frame 5 on the front side Fr of the vehicle.

The rear part of the upper attachment portion 55 on the rear side of the vehicle is fixed by welding to the upper surface portion 49 of the suspension arm attachment portion 52, and the front part thereof on the front side Fr extends from the upper surface portion 49 to the front side Fr of the vehicle. Then, a first nut N1 is fixed by welding to the upper surface of the upper attachment portion 55.

Figure 10:
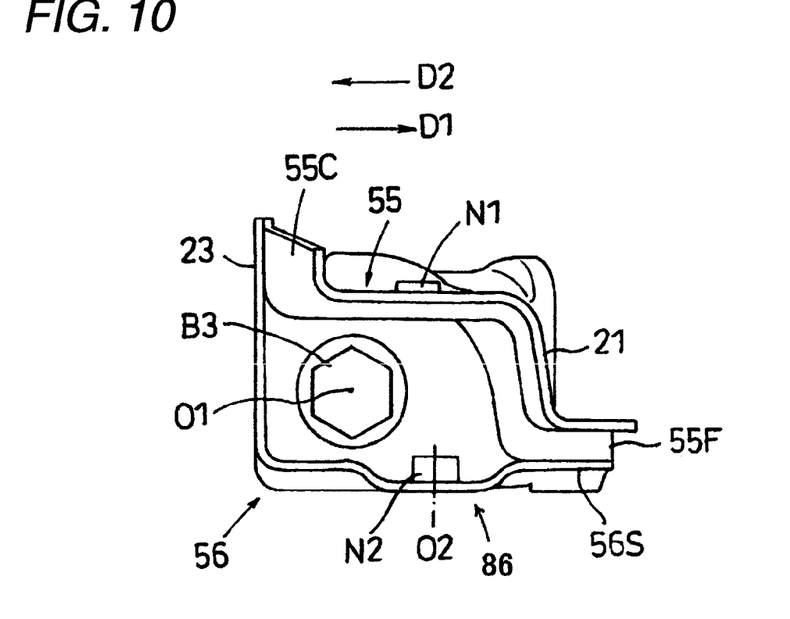
FIG. 10 is a front view illustrating a state in which an upper attachment portion and a lower attachment portion are mounted.
Figure 11:
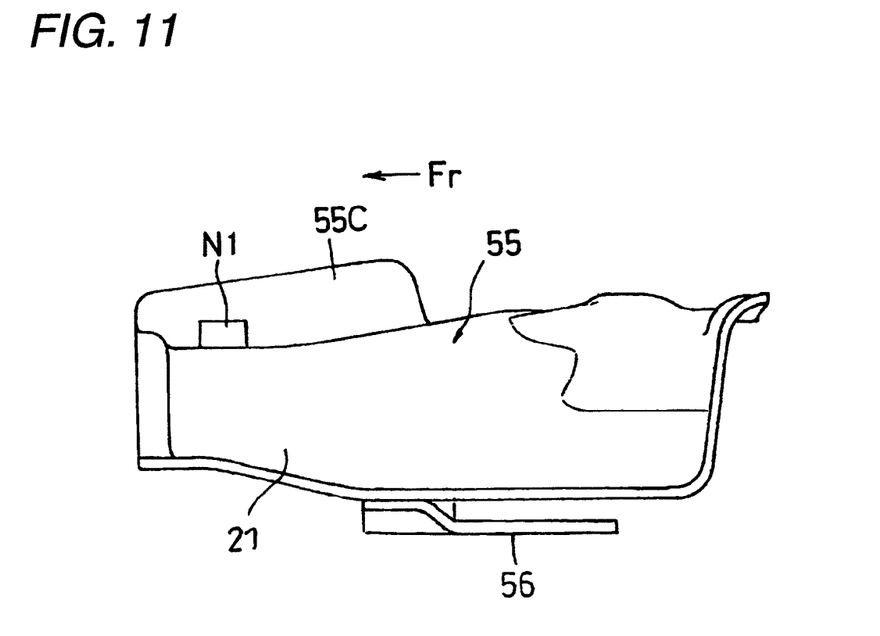
FIG. 11 is a side view illustrating the state in which the upper attachment portion and the lower attachment portion are mounted.

The lower attachment portion 56 is provided with a welding attachment piece 24 which extends from the side portion thereof on the inside D1 of the width direction of the vehicle to the rear side of the vehicle. At this time, the attachment piece 24 and the rear end portion of the lower attachment portion 56 on the outside D2 of the width direction of the vehicle are fixed by welding to the lower surface of the suspension arm attachment portion 52. A second nut N2 is fixed by welding to the upper surface of the lower attachment portion 56. As shown in FIG. 10, a side portion 56S of the lower attachment portion 56 on the inside D1 of the width direction of the vehicle overlaps with a bent piece 55F from the downside, the bent piece 55F being formed in a side portion of the upper attachment portion 55 on the inside D1 of the width direction of the vehicle.

As shown in FIG. 9, a first bolt insertion hole S1 which is concentric with the first nut N1 is formed in the lower wall 71 of the apron lower member 2, the strengthening plate member 95, a first attachment portion 70A of the upper wall 70, and the upper attachment portion 55. Then, in the state that a second collar K2 which is concentric with the first nut N1 is interposed between the upper wall 70 and the lower wall 71, upper and lower end portions of the second collar K2 are fixed by welding to the lower surface of the upper wall 70 and the upper surface of the lower wall 71. Then, the first attachment portion 70A of the upper wall 70 overlaps with the upper attachment portion 55 from the downside, and the first attachment bolt B1 is inserted through the first bolt insertion hole S1 and the second collar K2 from the downside of the lower wall 71 and the strengthening plate member 95. At the same time, the attachment bolt B1 is screw-connected to the first nut N1, and thus the first attachment portion 70A of the upper wall 70 is fixed to the upper attachment portion 55 by a bolt from the downside.

Meanwhile, a second bolt insertion hole S2 which is concentric with the second nut N2 is formed in a second attachment portion 71A of the lower wall 71, the strengthening plate member 95, and the lower attachment portion 56. Then, the second attachment portion 71A of the lower wall 71 overlaps with the lower attachment portion 56 from the downside, the second attachment bolt B2 is inserted through the second bolt insertion hole S2 from the downside of the lower wall 71. At the same time, the second attachment bolt B2 is screw-connected to the second nut N2, and thus the second attachment portion 71A is fixed to the lower attachment portion 56 by a bolt.

As shown in FIG. 9, the upper attachment portion 55 extends to the front side Fr with respect to the lower attachment portion 56, and the first nut N1 of the upper attachment portion 55 is disposed at a position closer to the front side Fr than the second nut N2 of the lower attachment portion 56. A distance L from an outer surface 53M of the front wall 53 of the suspension arm attachment portion 52 to an end edge 56M of the lower attachment portion 56 on the front side Fr of the vehicle is 50 mm (the distance is not limited to this value). Accordingly, when an operator carries out a screw-connecting operation of the third nut N3 by inserting the suspension arm attachment bolt B3 through the suspension-arm-attachment bolt insertion hole S3, it is possible for the operator to insert a hand to a position around the suspension-arm-attachment-bolt insertion hole S3 and it is possible to grip the suspension arm attachment bolt B3 with a hand until the suspension arm attachment bolt B3 engages with the third nut N3, thereby facilitating the screw-connecting operation. As a result, it is not necessary to shorten the length of the suspension arm attachment bolt B3.

Additionally, the second attachment portion 71A of the lower wall 71 extends to the rear side of the vehicle with respect to the first attachment portion 70A of the upper wall 70, and a first vertical wall 21 extends downward from the side portion of the upper attachment portion 55 on the inside D1 of the width direction of the vehicle. Also, a second vertical wall 22 erects from the side portion of the rear end portion 71C of the lower wall 71 on the outside D2 of the width direction of the vehicle to thereby be opposed to the first vertical wall 21.

Then, a third vertical wall 23 erects from the side portion of the lower attachment portion 56 on the outside D2 of the width direction of the vehicle, and thus the upper end portion of the third vertical wall 23 overlaps with a bent piece 55C, which erects from the side portion of the upper attachment portion 55 on the outside D2 of the width direction of the vehicle, from the outside D2 of the width direction of the vehicle. The third vertical wall 23 is positioned at a position of the second vertical wall 22 on the inside D1 of the width direction of the vehicle.

As shown in FIGS. 9 and 10, when viewed in the longitudinal direction of the vehicle, an axial center O1 of the suspension-arm-attachment-bolt insertion hole S3 is positioned at a portion of the front wall 53 surrounded by the upper attachment portion 55, the lower attachment portion 56, the first vertical wall 21, and the second vertical wall 22 (third vertical wall 23). Then, the axial center O1 of the suspension-arm-attachment-bolt insertion hole S3 is deviated from an axial center O2 of the second nut N2 in the width direction D of the vehicle, and a lower attachment portion 86 to which the second nut N2 is fixed by welding is configured to be concave downward. Accordingly, the second nut N2 is prevented from interfering with the head part of the suspension arm attachment bolt B3 which is inserted through the suspension-arm-attachment-bolt insertion hole S3. Specifically, the second nut N2 and the first nut N1 are disposed at a position on the inside D1 of the width direction of the vehicle with respect to the axial line (axial center) O1 of the suspension arm attachment bolt B3, and the second nut N2 is disposed at a position closer to the inside D1 of the width direction of the vehicle than the first nut N1.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A front part structure of a vehicle body, comprising:
    a front-side component of a vehicle;
    a suspension frame disposed posterior to the front-side component in a longitudinal direction of the vehicle;
    an apron side member extending in the longitudinal direction; and an apron lower member extending in the longitudinal direction, connecting the front-side component and the suspension frame and being disposed below the apron side member, wherein the apron lower member is formed into a closed cross sectional shape;

wherein two walls of the apron lower member, which are opposed to each other are respectively fixed to the suspension frame;

wherein the two walls are an upper wall and a lower wall of the apron lower member, respectively;

wherein the suspension frame is provided with an upper attachment portion in which a first nut is fixed to an upper surface thereof and a lower attachment portion in which a second nut is fixed to an upper surface thereof;

wherein a first attachment bolt is threaded into the first nut so that a first attachment portion of the upper wall is fixed to the upper attachment portion of the suspension frame in a state that the first attachment portion overlaps with the upper attachment portion from the downside; and wherein a second attachment bolt is threaded into the second nut so that a second attachment portion of the lower wall is fixed to the lower attachment portion of the suspension frame in a state that the second attachment portion overlaps with the lower attachment portion from the downside.

2. The front part structure as set forth in claim 1, wherein the upper attachment portion extends to the front side of the vehicle with respect to the lower attachment portion; and wherein the first nut is disposed anterior to the second nut.

3. The front part structure as set forth in claim 2, wherein a first bolt insertion hole which is concentric with the first nut is formed in the lower wall, the first attachment portion, and the upper attachment portion;

wherein a collar which is concentric with the first nut is interposed between the upper wall and the lower wall;

wherein the first attachment bolt is inserted through the first bolt insertion hole and the collar from the downside of the lower wall so as to be threaded into the first nut;

wherein a second bolt insertion hole which is concentric with the second nut is formed in the second attachment portion and the lower attachment portion; and wherein the second attachment bolt is inserted through the second bolt insertion hole from the downside of the lower wall so as to be threaded into the second nut.

4. The front part structure as set forth in claim 3, wherein the second attachment portion extends to the rear side of the vehicle with respect to the first attachment portion;

wherein a first vertical wall is extended downward from a side portion of the upper attachment portion on the inside of a width direction of the vehicle; and wherein a second vertical wall is extended upward from a side portion of the lower wall on the outside of the width direction of the vehicle so as to be opposed to the first vertical wall.

5. The front part structure as set forth in claim 4, wherein a third vertical wall is extended upward from an outside portion of the lower attachment portion in the width direction of the vehicle so that an upper end portion of the third vertical wall overlaps with an outside portion of the upper attachment portion in the width direction of the vehicle.

6. The front part structure as set forth in claim 4, wherein a suspension arm attachment portion of the suspension frame is disposed in an end portion of the suspension frame on the front side of the vehicle;

wherein a front wall and a rear wall are provided in the suspension arm attachment portion so as to be opposed to each other in the longitudinal direction of the vehicle;

wherein a third bolt insertion hole is formed in the front wall and the second wall so that a suspension arm attachment bolt is inserted therethrough; and wherein the upper attachment portion is extended to the front side of the vehicle from an upper surface portion suspended between upper end portions of the front wall and the rear wall.

* * * * *